US007480707B2

(12) United States Patent
Morlitz

(10) Patent No.: US 7,480,707 B2
(45) Date of Patent: Jan. 20, 2009

(54) NETWORK COMMUNICATIONS MANAGEMENT SYSTEM AND METHOD

(75) Inventor: David M. Morlitz, Poughkeepsie, NY (US)

(73) Assignee: International Business Machines Corporation, Armonk, NY (US)

(*) Notice: Subject to any disclaimer, the term of this patent is extended or adjusted under 35 U.S.C. 154(b) by 990 days.

(21) Appl. No.: 09/858,840

(22) Filed: May 16, 2001

(65) Prior Publication Data

US 2002/0174208 A1   Nov. 21, 2002

(51) Int. Cl.
*G06F 15/173* (2006.01)
*G06F 15/16* (2006.01)

(52) U.S. Cl. .................... 709/223; 709/224
(58) Field of Classification Search ............... 709/223, 709/224
See application file for complete search history.

(56) References Cited

U.S. PATENT DOCUMENTS

| | | | | |
|---|---|---|---|---|
| 4,771,391 | A * | 9/1988 | Blasbalg | 709/232 |
| 5,193,151 | A * | 3/1993 | Jain | 709/237 |
| 5,894,554 | A | 4/1999 | Lowery et al. | |
| 5,956,716 | A | 9/1999 | Kenner et al. | |
| 6,003,082 | A | 12/1999 | Gampper et al. | |
| 6,006,260 | A | 12/1999 | Barrick, Jr. et al. | |
| 6,052,726 | A * | 4/2000 | Fontenot | 709/224 |
| 6,085,238 | A * | 7/2000 | Yuasa et al. | 709/223 |
| 6,167,445 | A * | 12/2000 | Gai et al. | 709/223 |
| 6,219,050 | B1 * | 4/2001 | Schaffer | 345/853 |
| 6,563,793 | B1 * | 5/2003 | Golden et al. | 370/236 |
| 6,640,248 | B1 * | 10/2003 | Jorgensen | 709/226 |
| 6,839,327 | B1 * | 1/2005 | Zavalkovsky et al. | 370/252 |
| 6,845,091 | B2 * | 1/2005 | Ogier et al. | 370/338 |
| 6,871,233 | B1 * | 3/2005 | Bearden et al. | 709/226 |
| 2001/0040895 | A1 * | 11/2001 | Templin | 370/466 |

OTHER PUBLICATIONS

Tsaoussidis, V. and Wei, S. "QoS Management at the Transport Layer," Mar. 2000, IEEE, pp. 312-317.*
Lim, Hyo-Sang et al. "Priority Queue-Based IEEE 1394 Device Driver Supporting Real-Time Characteristics," Aug. 2000, IEEE, vol. 46, Issue 3, pp. 825-833.*
K. White, RFC 2758—Definitions of Managed Objects for Service Level Agreements Performance Monitoring, Feb. 2000, IBM.*

* cited by examiner

*Primary Examiner*—Jason D Cardone
*Assistant Examiner*—Azizul Choudhury
(74) *Attorney, Agent, or Firm*—Cantor Colburn LLP; William Kinnaman, Jr.

(57) ABSTRACT

A method of managing communications in a packet switching network, the method including: associating a connection protocol and an application name with connection information from an IP datagram, the connection information including an IP address of a computer originating the IP datagram, a port number in the computer originating the IP datagram, an IP address of a remote computer, and a port number in the remote computer; storing communication session data in a file storage of the computer originating the IP datagram, the communication session data indicating the connection protocol, the application name, and the connection information; storing the communication session data in a file storage of a packet transmission device; storing a policy statement in the file storage of the packet transmission device; and applying the policy statement to a plurality of TCP/IP packets including the connection information to manage communication of the plurality of TCP/IP packets.

36 Claims, 11 Drawing Sheets

| REMOTE IP ADDRESS | REMOTE PORT # | ORIGINATING IP ADDRESS | ORIGINATING PORT # | APPLICATION NAME | CONNECTION PROTOCOL | SERVER IP ADDRESS |
|---|---|---|---|---|---|---|
| 150.123.34.234 | 80 | 150.223.34.111 | 18001 | NETSCAPE NAVIGATOR | HTTP | 150.335.34.134 |
| 150.123.34.157 | 110 | 150.223.34.111 | 18005 | NETSCAPE MESSENGER | POP | 150.335.34.134 |

USER POLICY

POP3 PRIORITY = 1
NETSCAPE NAVIGATOR PRIORITY = 2
FTP PRIORITY = 1
QUEUE UPLOAD IF SIZE > 3MEG AND PRIORITY < 1

ENTERPRISE POLICY

POP3 PRIORITY = 1
FTP PRIORITY = 3
NETSCAPE NAVIGATOR PRIORITY = 2
QUEUE UPLOAD IF SIZE > 3MEG AND PRIORITY < 1

FIG. 8

| REMOTE IP ADDRESS | REMOTE PORT # | ORIGINATING IP ADDRESS | ORIGINATING PORT # | APPLICATION NAME | CONNECTION PROTOCOL |
|---|---|---|---|---|---|
| 150.123.34.112 | 80 | 150.223.34.124 | 18001 | NETSCAPE NAVIGATOR | HTTP |
| 150.123.34.157 | 110 | 150.223.34.111 | 18005 | NETSCAPE MESSENGER | POP3 |

FIG. 9

NETWORK COMMUNICATIONS MANAGEMENT SYSTEM AND METHOD

BACKGROUND

In packet switching networks, such as the Internet, one popular suite of communications protocols employed by packet transmission devices in packet switching networks is the Transport Control Protocol/Internet Protocol (TCP/IP). TCP/IP can be characterized as a stack of five protocol layers: the application layer, the transport control protocol (TCP) layer, the internet protocol (IP) layer, the network access layer, and the physical layer. The application layer represents any application running on a workstation computer. For example, the application may be an e-mail program, a database program, an internet browser, or the like. Processes implementing the sockets layer provide port numbers to keep track of individual connections between applications running on different workstation computers. Processes implementing TCP layer break the user data into segments and append a headers including control information, such as the destination port, segment sequence number, and checksum, to each of these segments. The TCP segments are then passed to processes implementing IP, which append a header of control information such as the destination computer's address to the segment, creating an IP datagram. Finally, each IP datagram is presented to the processes implementing the network access layer, which attach a header of information pertaining to the appropriate sub-network to the IP datagram. The end result is one or more TCP/IP packets including the user data encapsulated by headers appended at the various layers of the TCP/IP protocol stack.

The TCP/IP packets are directed to their final destination by packet transmission devices such as routers, bridges, gateways, or the like. These packet transmission devices use the data available within the headers at different levels of the TCP/IP stack to determine the appropriate route to send the packets. For example, a router directs a TCP/IP packet using the IP address, which is available in the IP header. The router receives the TCP/IP packet, strips the network and IP headers from the packet, and inspects the IP address in the IP header to determine the packet's final destination. The router then attaches the IP and network headers and sends the TCP/IP packet to the final destination or to another packet transmission device en route to the final destination. The router typically determines the path that the packet is to take by monitoring traffic in the network and sending the packet along the path having the least traffic. However, because the information within a TCP/IP packet's various headers is limited, the communications management capability of routers and other packet transmission is also limited.

BRIEF DESCRIPTION OF THE INVENTION

The above discussed and other drawbacks and deficiencies are overcome or alleviated by a method for managing communications in a packet switching network. The method includes: associating a connection protocol and an application name with connection information from an IP datagram, the connection information including an IP address of a computer originating the IP datagram, a port number in the computer originating the IP datagram, an IP address of a remote computer, and a port number in the remote computer; storing communication session data in a file storage of the computer originating the IP datagram, the communication session data indicating the connection protocol, the application name, and the connection information; storing the communication session data in a file storage of a packet transmission device; storing a policy statement in the file storage of the packet transmission device; and applying the policy statement to a plurality of TCP/IP packets including the connection information to manage communication of the plurality of TCP/IP packets.

BRIEF DESCRIPTION OF THE DRAWINGS

The present invention will now be described, by way of example only, with reference to the accompanying drawing in which:

FIG. 4 is a local registration table;

FIG. 5 is a user policy table;

FIG. 8 is an enterprise policy table;

FIG. 9 is an enterprise registration table;

DETAILED DESCRIPTION

Figure 1:
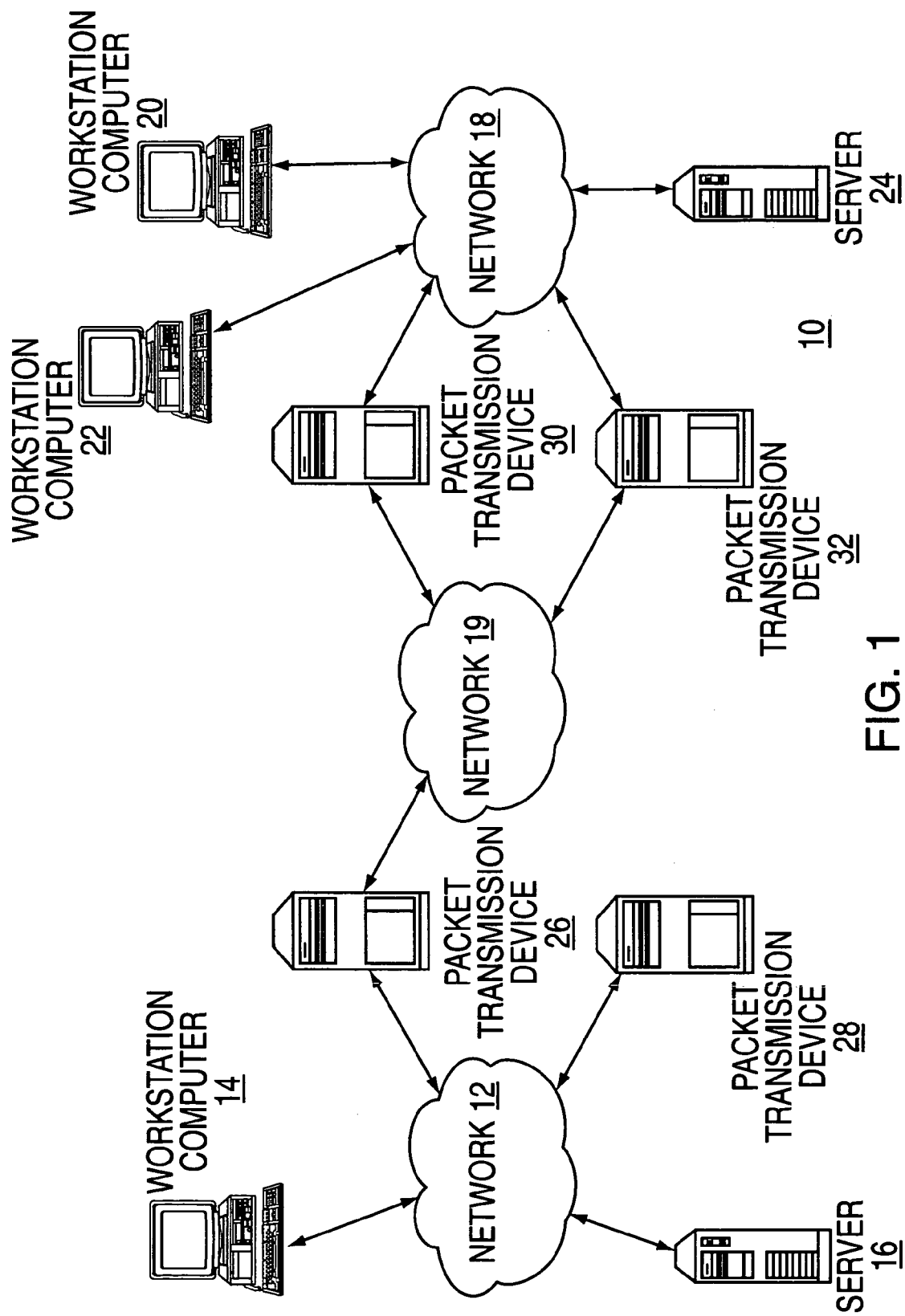
FIG. 1 is a schematic diagram depicting a computer network comprising two or more computer networks.

FIG. 1 is a schematic diagram depicting a computer network 10 comprising two or more computer networks 12 and 18 connected to a computer network 19 via a plurality of packet transmission devices 26, 28, 30, and 32. Each packet transmission device 26, 28,30, and 32 represents a router, gateway, bridge, or the like. While only four packet transmission devices are shown, it will be recognized that the number of packet transmission devices can be greater or smaller depending on the size of network 10. In the present embodiment, network 19 represents the Internet, and networks 12 and 18 represent enterprise networks. It will be recognized, however, that the size and arrangement of networks 12, 18, and 19 is not limited to this embodiment.

Network 12 comprises one or more workstation computers 14 and one or more server computers 16. Similarly, network 18 comprises one or more workstation computers 22 and 20, and one or more server computers 24.

Each arrow shown in FIG. 1 represents a connection for passing information between the various devices and networks. These connections may be made through any type of data transmission means, such as wires, fiber optic, radio transmission, or the like. The information passing along the connections is encapsulated in packets formatted in accordance with a stack of protocols such as the TCP/IP stack of protocols.

Figure 2:
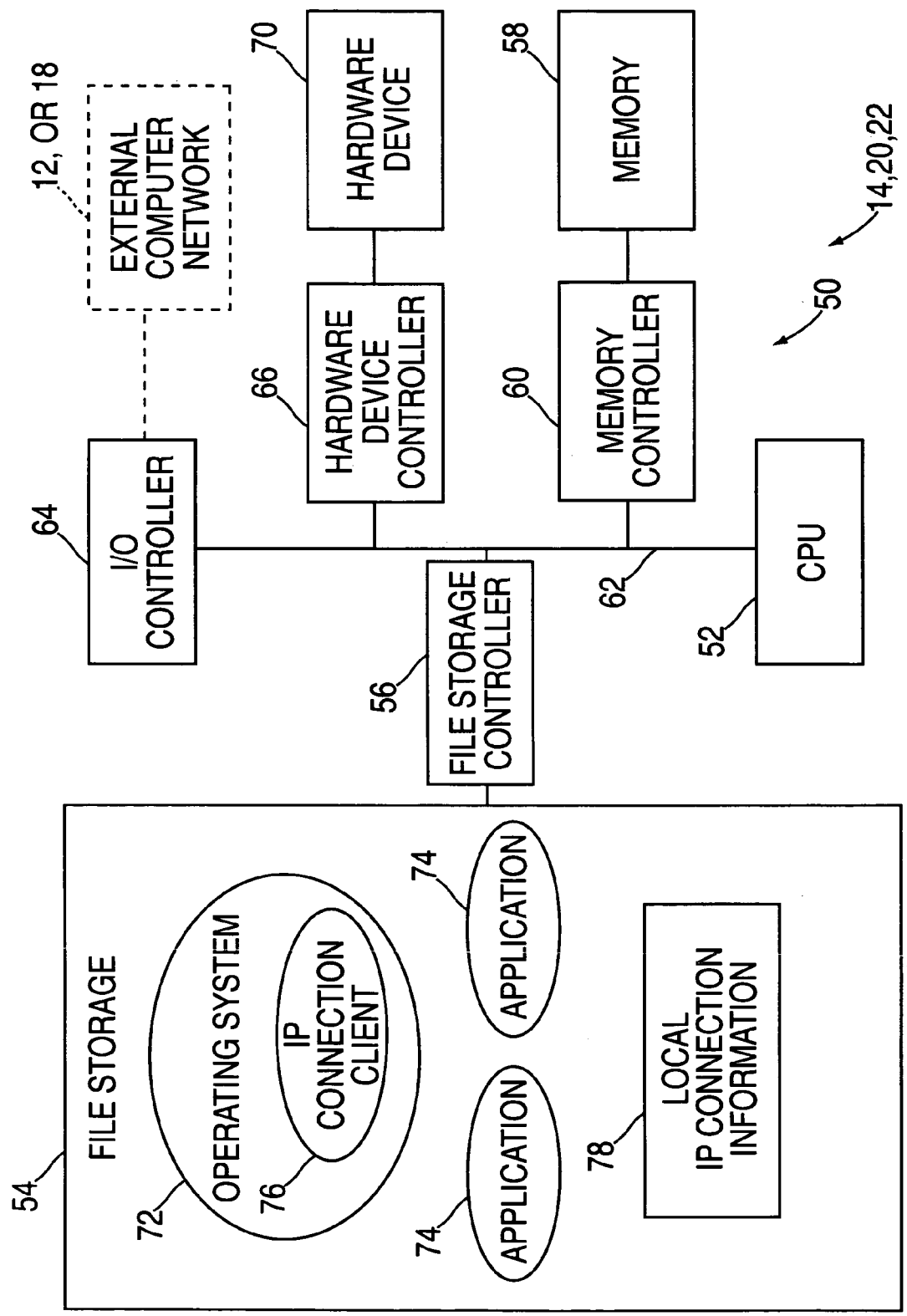
FIG. 2 is a schematic diagram depicting a workstation computer.

Referring to FIG. 2, each workstation computer 14,20, and 22 (FIG. 1) includes a computer system 50, which comprises a central processing unit (CPU) 52 that accesses file storage 54 (e.g. one or more disk drives) by means of file storage controller 56, and accesses memory 58 by means of memory controller 60. A system bus 62 interconnects the CPU 52, file controller 56 and memory controller 60. The computer system 50 also includes an input/output (I/O) controller 64 and one or more hardware device controllers 66 connected to the CPU 52 via bus 62. The I/O controller 64 connects the computer system 50 with a neighboring network 12 or 18 (as shown in FIG. 1). Each hardware device controller 66 controls one or more hardware devices 70 (e.g., a printer or a keyboard).

Resident in file storage 54 is an operating system program 72, one or more application programs 74, and local connection information 78. Also resident in file storage 54 is an IP connection client program 76, which forms part of operating system 72. Application program 74 is an e-mail program, a database program, an Internet browser, or the like.

As is known in the art, the operating system 72 directs the CPU 52 to perform basic tasks to enable data communications between the workstation in which operating system 72 installed and local servers or packet transmission devices in the same network. The application program 74 directs the CPU 52 to execute various processes in the operating system 72 (i.e., the application program 74 "calls" various processes in the operating system 72) to perform these routine communications tasks. As a matter of convention, it is typically stated that the operating system 72 "performs" these tasks, even though one skilled in the art would recognize that the operating system 72 is a computer program that is executed by the processor 52, and that the processor 52 or other device controller 56, 64, 66 or 60 physically performs these tasks. This convention will be adhered to hereinafter, with one skilled in the art recognizing that an operating system 72, application program 74, IP connection client 75, or other process directs computer system 50 to perform the communications tasks. Also, as used herein, the term "process" is a general term for a set of computer instructions. A process includes any program, subroutine, class, object or other term of art used to denote a set of computer instructions.

Figure 3:
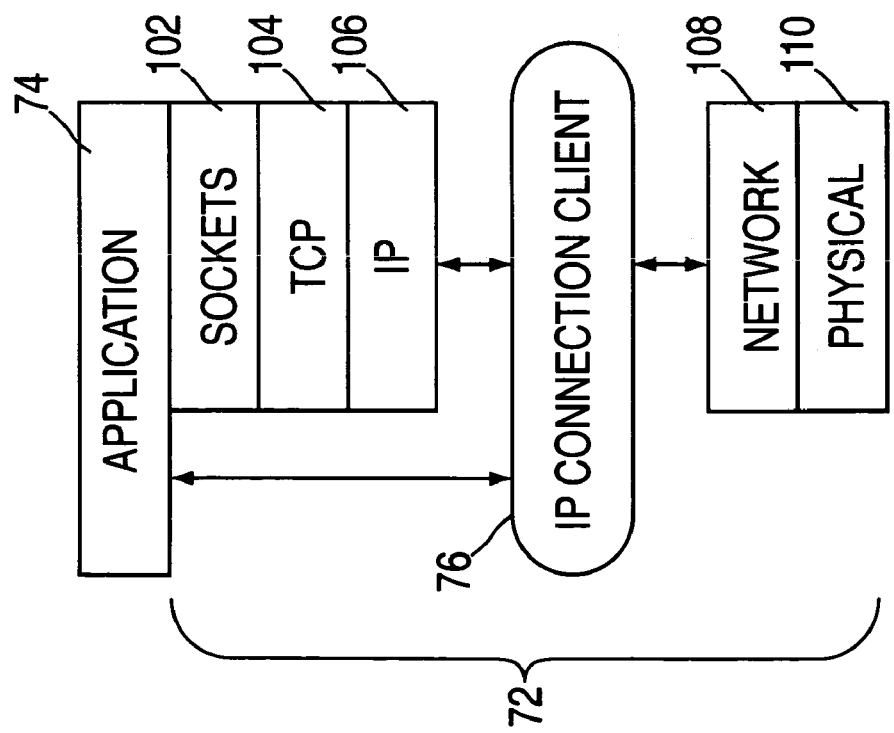
FIG. 3 is a schematic diagram depicting a portion of an operating system in the workstation computer of FIG. 2.

Referring to FIG. 3, operating system 72 includes a stack of protocol layers 102, 104, 106, 108 and 110, with layers 102, 104, 106, 108 and 110 representing a process or group of processes that perform related communications tasks according to a communications protocol. In this example, the stack of layers 102, 104, 106, 108 and 110 is known as the Transport Control Protocol/Internet Protocol (TCP/IP) stack. Processes in each layer 102, 104, 106, 108 and 110 can call on, or be called by processes in adjacent layers or applications. Layer 102 is the sockets layer; layer 104 is the TCP layer; layer 106 is the IP layer; layer 108 is the network protocol layer; and layer 110 is the physical layer. The functions of the processes in the various layers of the TCP/IP stack are well known in the art. Operating system 72 also includes IP connection client process 76 that can call on or be called by application 74, IP layer 106, and network layer 108. The IP connection client 76 will be described in further detail hereinafter.

Referring again to FIG. 2, the local connection information 78 stored within file storage 54 includes a registration table and a user policy table, which are shown at 150 and 152 in FIGS. 4 and 5, respectively. Referring first to FIG. 4, local registration table 150 includes a Remote IP Address field and a Remote Port # field, which identify an IP address of a remote workstation computer and a port number for an application in the remote workstation computer, respectively. Local registration table 150 also includes a Originating IP Address field and an Originating Port # field, which identify an IP address of a local workstation computer and a port number for an application in the local workstation computer, respectively.

Each row of local registration table 150 identifies a communications session between the application program on the local workstation and the application program on the remote workstation computer, with the combination of the Remote IP Address, Remote Port #, Originating IP Address, and Originating Port # fields identifying the communications connection. An Application Name field identifies the local application (e.g., Netscape Navigator, Netscape Messenger, etc.), a Connection protocol field identifies the protocol of the connection established (e.g., HTTP, POP3). Each communications session (i.e., row of registration table 150) is managed by a packet transmission device, as will be described in further detail hereinafter. The IP address for the packet transmission device managing the session is identified in local registration table 150. Referring to FIG. 5, user policy table 152 includes various message handling policies for a local user. Such policies may prioritize messages based on message protocol (e.g., POP 3, FTP, HTTP) or message size, or program type. The various policies listed in the user policy table 152 are set by individual users to define the communications policy for the individual user.

Referring to FIGS. 2 and 5, the IP connection client 76 provides an interface that allows individual users to enter user policy data into a user policy table 152. After data is entered by a user, the user policy table 152 is then be keyed to that individual user by an IP address, user ID and password, sub-net or other policy specific information. The IP connection client 76 provides replica of the user policy table 152 to a packet transmission device in which the IP connection server will store the user policy table 152 along with a plurality of user policy tables 152 for other users. The IP connection client 76 may update the replica of the user policy table 152 if the user should change any of his or her policies.

Figure 6:
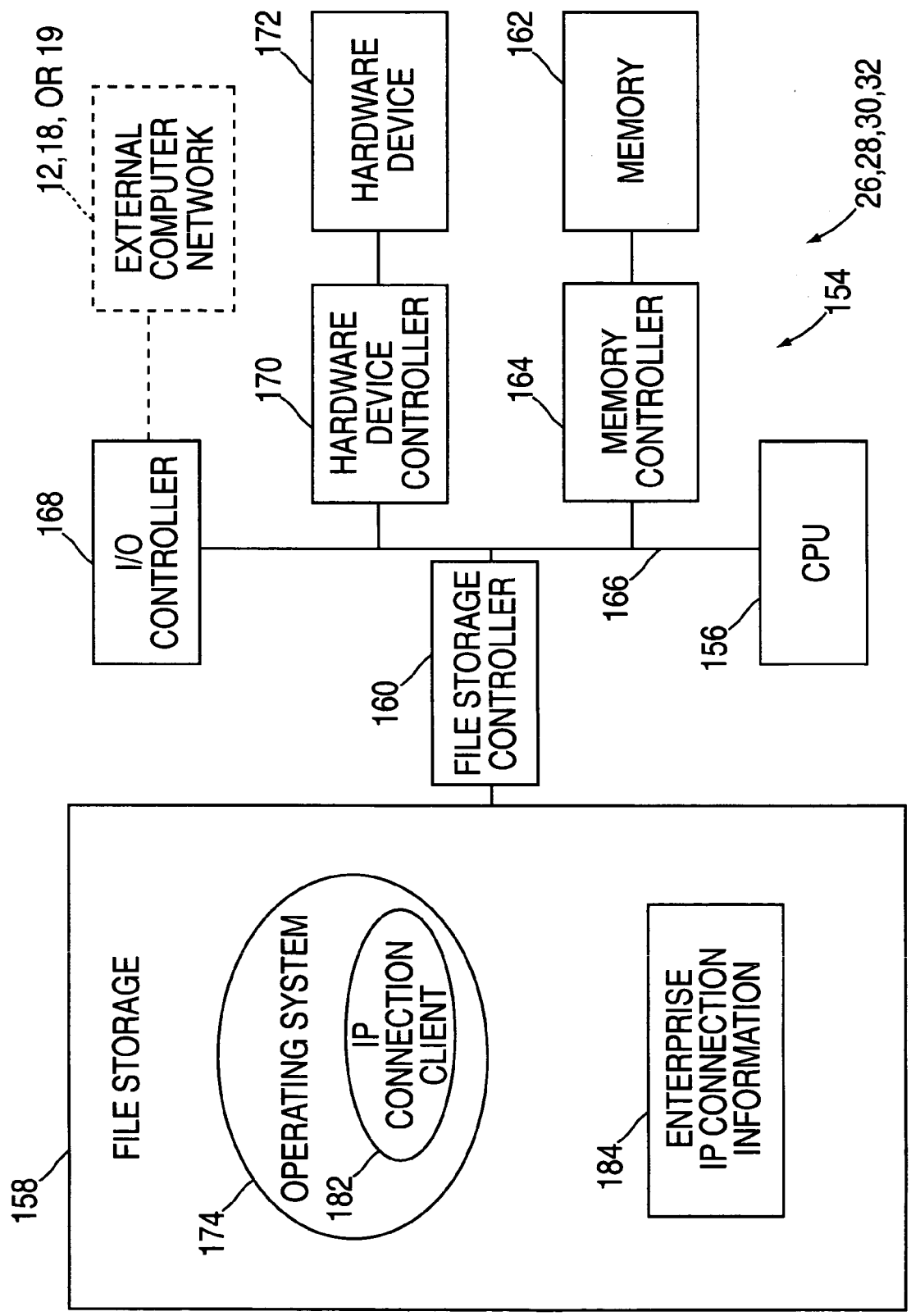
FIG. 6 is a schematic diagram depicting a packet transmission device.

Referring to FIG. 6, each packet transmission device 26, 28, 30, and 32 (FIG. 1) includes a computer system 154, which comprises a central processing unit (CPU) 156 that accesses file storage 158 (e.g. one or more disk drives) by means of file storage controller 160, and accesses memory 162 by means of memory controller 164. A system bus 166 interconnects the CPU 156, file controller 160 and memory controller 164. The computer system 154 also includes an input/output (I/O) controller 168 and one or more hardware device controllers 170 connected to the CPU 156 via bus 166. The I/O controller 168 connects the computer system 154 with one or more neighboring networks. Each hardware device controller 170 controls one or more a hardware devices 172 (e.g., a printer, keyboard, or monitor).

Resident in file storage 158 is an operating system program 174, which includes an IP connection server program 182. Also resident in file storage 158 is enterprise connection information 184. The operating system 174 performs basic routing, bridge, or gateway functions to enable the communication of information between networks (12, 19, and 18 of FIG. 1) or between other packet transmission devices.

Figure 7:
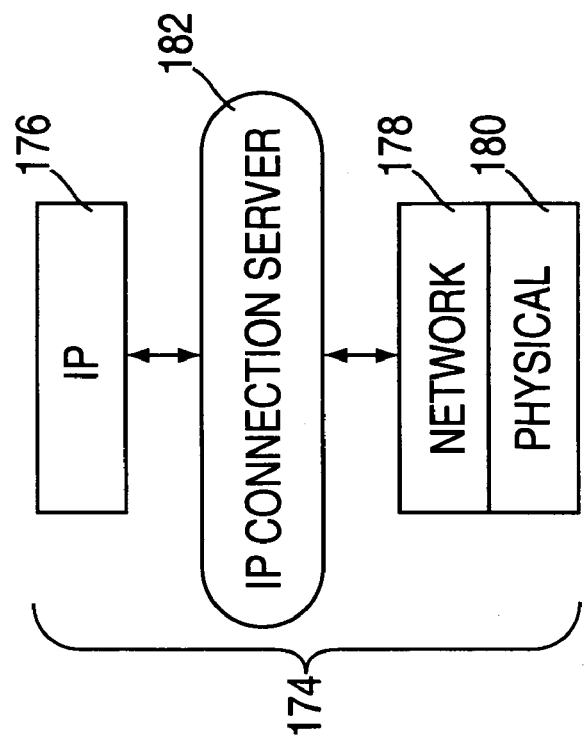
FIG. 7 is a schematic diagram depicting a portion of an operating system in the packet transmission device of FIG. 6.

Referring to FIG. 7, operating system 174 comprises a stack of protocol layers 176, 178, and 180, with each layer 176, 178 and 180 representing a process or group of processes that perform related communications tasks according to a communications protocol. Layer 176 is the IP layer; layer 178 is the network layer; and layer 180 is the physical layer. The functions and processes in these various layers are well known in the art. Operating system 174 further includes an IP connection server 182. IP connection server 182 is configured to call on, or be called by, IP layer 176, and network layer 178. IP connection server 182 will be described in further detail hereinafter.

Referring again to FIG. 6, the enterprise connection information 184 stored within file storage 158 includes one or more user policy tables 152, as previously described with reference to FIG. 5, an enterprise policy table 186, as shown in FIG. 8, and an enterprise registration table 188, as shown in FIG. 9.

Referring to FIG. 8, enterprise policy table 186 includes various message handling policies for an enterprise, as would be set by a system administrator to control communications policies for the entire enterprise. Such policies may prioritize messages based on message protocol (e.g., POP 3, FTP) message size, or program type. The various policies listed in enterprise policy table 186 override any user policies listed in the one or more user policy tables 152, as will be described in further detail hereinafter.

Referring to FIG. 9, enterprise registration table 188 includes a Remote IP Address field and a Remote Port # field, which identify an IP address of a remote workstation computer and a port number for an application in the remote workstation computer, respectively. Enterprise registration table 188 also includes an Originating Local IP Address field and an Originating Local Port # field, which identify an IP address of the workstation computer that originated the communications session and a port number for the application in the workstation computer that originated the communications session, respectively. Each row in enterprise registration table 188 represents one communication session that is being handled by IP connection server 182, with the combination of the Remote IP Address, Remote Port #, Originating IP Address, and Originating Port # fields identifying the communications connection. An Application Name field identifies the local application (e.g., Netscape Navigator, Netscape Messenger, etc.), and a Connection protocol field identifies the type of connection established (e.g., HTTP, POP 3) for the session. The information for each row in enterprise registration table 188 is provided by local workstations prior to establishing a communications connection with a remote workstation, as will be described in further detail hereinafter.

Referring to FIGS. 6 and 8 the IP connection server 182 provides an interface that allows a system administrator to enter enterprise policy data into the enterprise policy table 186. The interface includes security, such as a password system, to prevent unauthorized changing of the enterprise policy data.

Figure 10A:
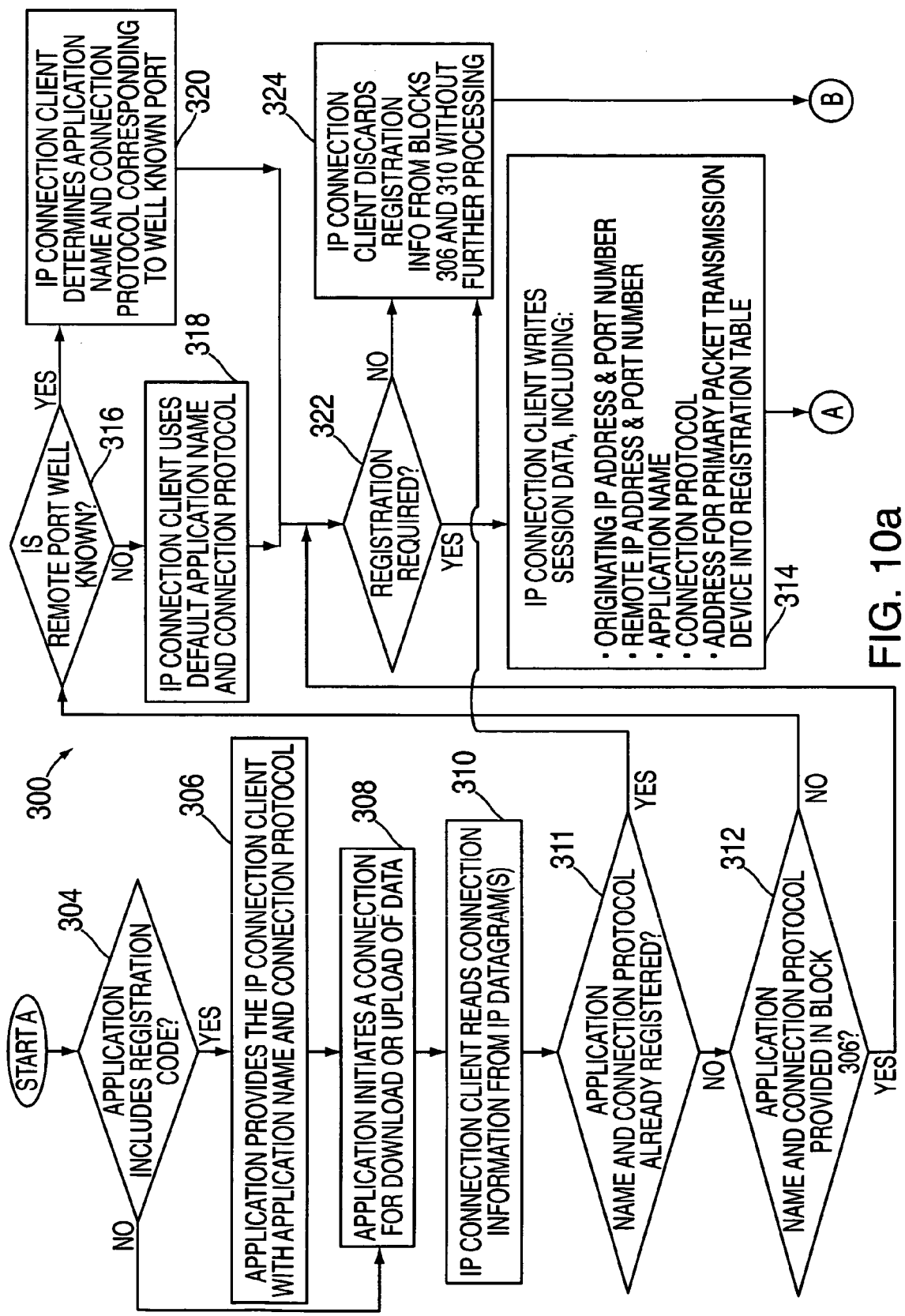
FIG. 10a-10b is a flow chart depicting a registration process for populating the local registration table of FIG. 4 and the enterprise registration table of FIG. 9.
Figure 10B:
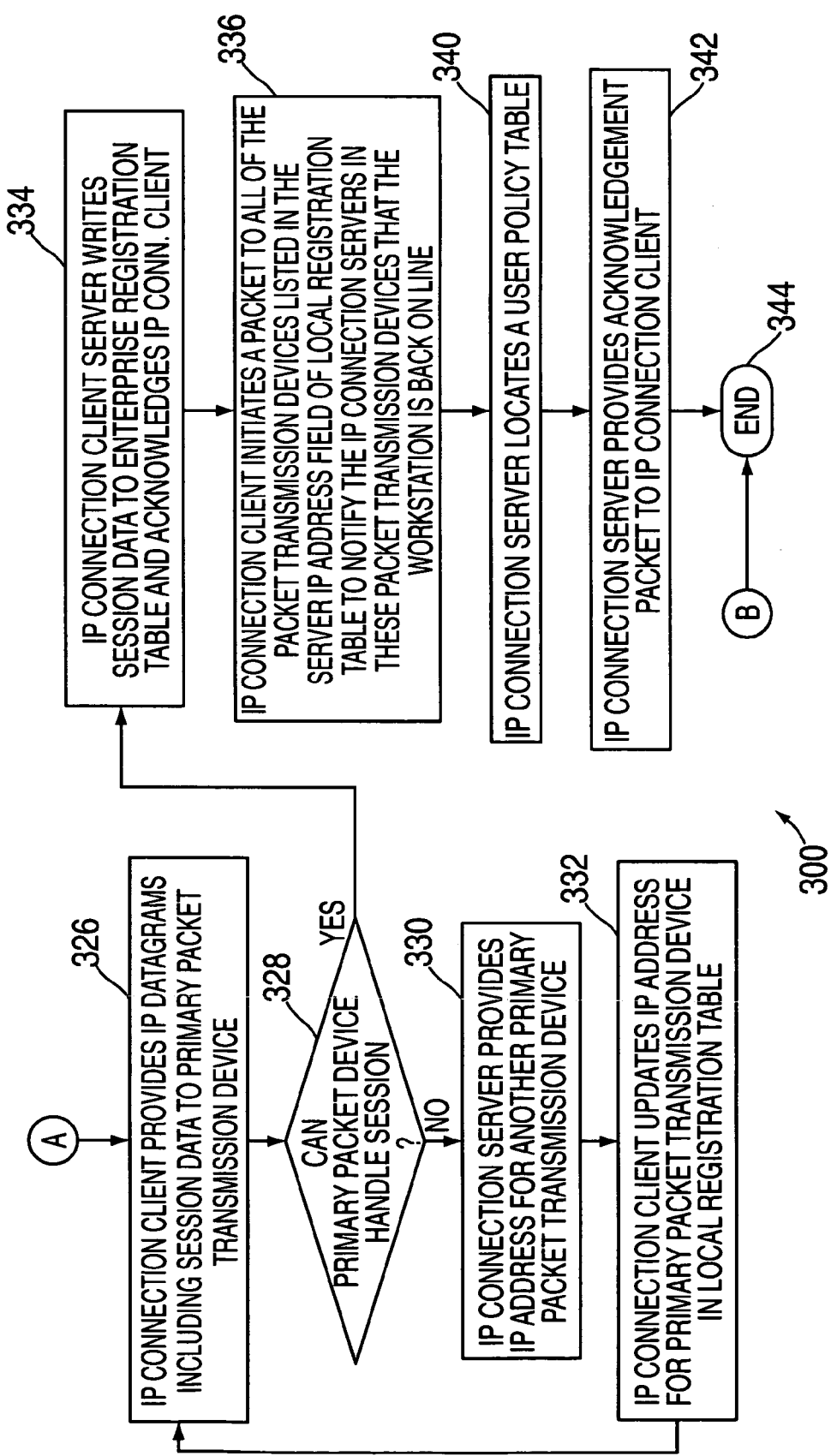

Referring to FIGS. 1 through 10 data in the local and enterprise registration tables 150 and 188 are entered by the IP connection client 76 and IP connection server 182, respectively, using a registration process, which is shown generally at 300 in FIGS. 10a and 10b. If in block 304, application 74 includes instructions for using the registration process, then process 300 continues at block 306. If application 74 does not include instructions for using the registration process, then process 300 proceeds to block 308. At block 306, the application 74 in a workstation, for example, workstation 22, initiates a request for the upload or download of information by calling the IP connection client 76 and providing the IP connection client 76 with information including an identification of the application 74 making the request (e.g., the application name) and the connection protocol for the connection to be made. This information is temporarily stored in file storage 54 by the IP connection client 76. In block 308, the application 74 initiates a connection for the upload or download of data in a well-known manner, through the sockets layer 102 of the operating system 72. As is known in the art, the TCP layer 104 receives the necessary upload or download request information from application 74 via sockets layer 102, breaks this information into one or more segments, and appends a TCP header to each of the one or more segments. The IP layer 106 appends an IP header to the one or more TCP segments, creating one or more IP datagrams, as is known in the art. The IP datagrams are then provided to IP connection client 76. The IP connection client 76 reads the local IP address and port number, and the remote IP address and port number from the IP datagram as shown at block 310. Process 300 then continues to block 311.

At block 311, the IP connection client checks local registration table 150 to determine if the application name and connection protocol are already registered for the remote and Originating Addresses and Ports #'s involved in the data session. If the session data is already registered, then process 300 continues to block 324, where IP connection client 76 discards the temporarily stored registration information from blocks 306 and 310 without further registration processing. However, if the session data is not already registered, then process 300 continues from block 311 to block 312.

In block 312, the IP connection client determines whether or not an application name and connection protocol were provided in block 306. The application 74 has not provided the IP connection client 76 with application name and connection protocol in block 306 (i.e., if in block 304 application 74 does not include instructions for using the registration process) then process 300 continues at block 316. At block 316, the IP connection client 76 will check the remote port, number to determine if it is a well-known port typically reserved for certain applications (e.g., port 80 is typically reserved for HTTP and port 110 is typically reserved for POP 3). If it is a well-known port then process 300 continues at block 320 where the IP connection client will determine the connection protocol typically associated with that well-known port. If the port number is not a well-known port, process 300 continues at block 318 where the IP connection client 76 will retrieve default communication parameters.

From blocks 312, 318 and 320, process 300 continues to block 322. Using the IP connection information from the IP datagrams and the application and connection types, the IP connection client 76 determines if registration of the session is required. In general, registration is not necessary if the overhead created by the registration process would outweigh any communications management advantages. Registration would not be necessary, for example, if the packets to be uploaded or downloaded during the communications session would not pass through any IP connection server 26, 28, 30, or 32. Using FIG. 1 to describe this example, if an application 74 in workstation computer 20 were to request an upload or download of registration data from an application in workstation 22, the IP connection client 76 in workstation 20 would recognize, using the destination IP address, that workstation 22 is in the same enterprise network 18. As another example, registration may also be unnecessary when the IP connection client 76 recognizes that the communication session is not expected to receive/transmit an amount of data in excess of an enterprise determined threshold. In this example, application programs 74 could identify to the IP connection client 76 such "short/bursty" sessions at block 306, when the application provides the IP connection client with the application and connection types. An example of this type of connection may be the download of a web page. However, this does imply a level of trust in applications 74 running in the client machine. Therefore, the IP connection server 182 includes a command to request an identification of the session from the IP connection client 76 if it determines that the amount of data being received exceeds the enterprise-determined threshold.

If registration of the session is unnecessary at block 322, then the registration process proceeds to block 324. At block 324, IP connection client 76 discards the temporarily stored registration information from blocks 306 and 310 without further registration processing. If registration of the session is necessary, however, then process continues at block 314 where the IP connection client 76 enters IP connection information, application name and connection protocol into a row in local registration table 150.

To complete the row of session information in the local registration table 150, the IP connection client 76 also enters an IP address for a packet transmission device 26, 28, 30, or 32 in the Server IP Address field. The packet transmission device identified in the Server IP Address field is the primary packet transmission device for that communication session. The primary packet transmission device may be a default packet transmission device assigned by a network administrator, or it may be the packet transmission device used in the previous session.

After IP connection client 76 enters the session data into the local registration table 150 at block 314, process 300 continues at block 326 where IP connection client 76 generates one or more IP datagrams including the session data. The IP datagrams are addressed to the primary packet transmission device and provided to the network layer 108. Network layer 108 and physical layer 110 process the IP datagrams, and the resulting packets are provided to the primary packet transmission device, e.g., packet transmission device 30.

From block 326, process 300 continues to block 328 where the IP connection server 182 in the primary packet transmission device 30 determines if it can handle the communications session. This determination is based on the number of sessions currently recorded in its enterprise registration table 188 or other policy considerations. If the IP connection server 182 in the primary packet transmission device can handle the session, process 300 continues to block 334 where the IP connection server 182 records the session data into a row in the enterprise registration table 188. After the session data is entered in table 188, IP connection server 182 then initiates an acknowledgement packet to workstation 22. Process 300 then continues to block 336 where, upon receiving this acknowledgement packet, IP connection client 76 initiates a packet to each primary packet transmission device listed in each row of local registration table 150. The packet indicates to the IP connection servers in the primary packet transmission devices that the workstation is back on line, allowing the IP connection servers 182 in these primary packet transmission devices to complete any data downloads or uploads with the workstation.

From block 336, process 300 continues at block 340 where the IP connection server 182 in the primary packet transmission device attempts to locate a user policy table 152 in file storage 158 using a workstation IP address, user ID and password, sub-net or other policy specific information. If the IP connection server 182 cannot find a user policy table 152 in file storage 158, then the IP connection server 182 requests the user policy table 152 from the IP connection client 76, another server on the network, or some central location. After the IP connection server 182 retrieves a user policy table 152 at block 340, process 300 continues at block 342, where IP connection server 182 initiates an acknowledgement packet to the IP connection client 76. The registration process is completed at block 344, when the IP connection client 76 receives this acknowledgement packet.

Returning to block 328, if the primary packet transmission device 30 cannot handle the session, it transfers the session to an alternate IP connection server 182 in another packet transmission device (e.g., packet transmission device 32). The IP connection server 182 in the primary packet transmission device 30 accomplishes this transfer request by providing a response packet including the IP address of the alternate packet transmission device 32 to the originating IP connection client 76. In block 332, the IP connection client 76 updates the server IP address field of local registration table 150 to include the IP address of the alternate packet transmission device 32. Alternate packet transmission device 32 is now the primary packet transmission device for this session. Process 300 then returns to block 326 where the IP connection client 76 initiates another packet to establish a connection with the new primary packet transmission device 32. This process continues until an IP connection server 182 accepts the session, or some limit of transfers is reached. Eventually, an IP connection server 182 accepts the session at block 328, and the registration process 30 continues at block 334 as described hereinabove.

After the registration process ends at block 334, the IP connection client 76 provides the original IP datagrams including the upload or download request information to the network layer 108. Network layer 108 and physical layer 110 process the IP datagrams in a manner well known in the art, and the resulting packets are provided to the primary packet transmission device.

To facilitate process 300 of FIGS. 10a and 10b, IP connection servers 182 send packets of information between each other to exchange information such as: which packet transmission devices have capacity to handle communications sessions; which links from inside the enterprise network to the outside are more reliable, faster, or cheaper; and enterprise policies. In addition, IP connection servers 182 can also provide commands to other IP connection servers 182. Such commands may include: a transfer command to transfer a session from one server to another; a performance inquiry command to retrieve performance information from another IP connection server 182; a policy retrieval command to retrieve enterprise or user policy information from another IP connection server 182; and a policy update command to provide updated enterprise policies to another IP connection server 182.

After the registration process 300 is completed, the IP connection server 182 is aware of the source address, destination address, and connection protocol of all network traffic that is to pass through that packet transmission device. Using this registration data, the IP connection server 182 performs IP connection management tasks. These IP connection management tasks include: interrupting large download and upload requests in response to local and enterprise policies; passing download and upload tasks to other packet transmission devices; and preventing the denial of service caused by a general flooding of a network in front of the packet transmission device. In addition, the registration data can be passed between the IP connection servers 182 in different packet transmission devices, allowing the IP connection servers 182 to share management responsibilities. Each of these tasks will now be described.

Figure 11:
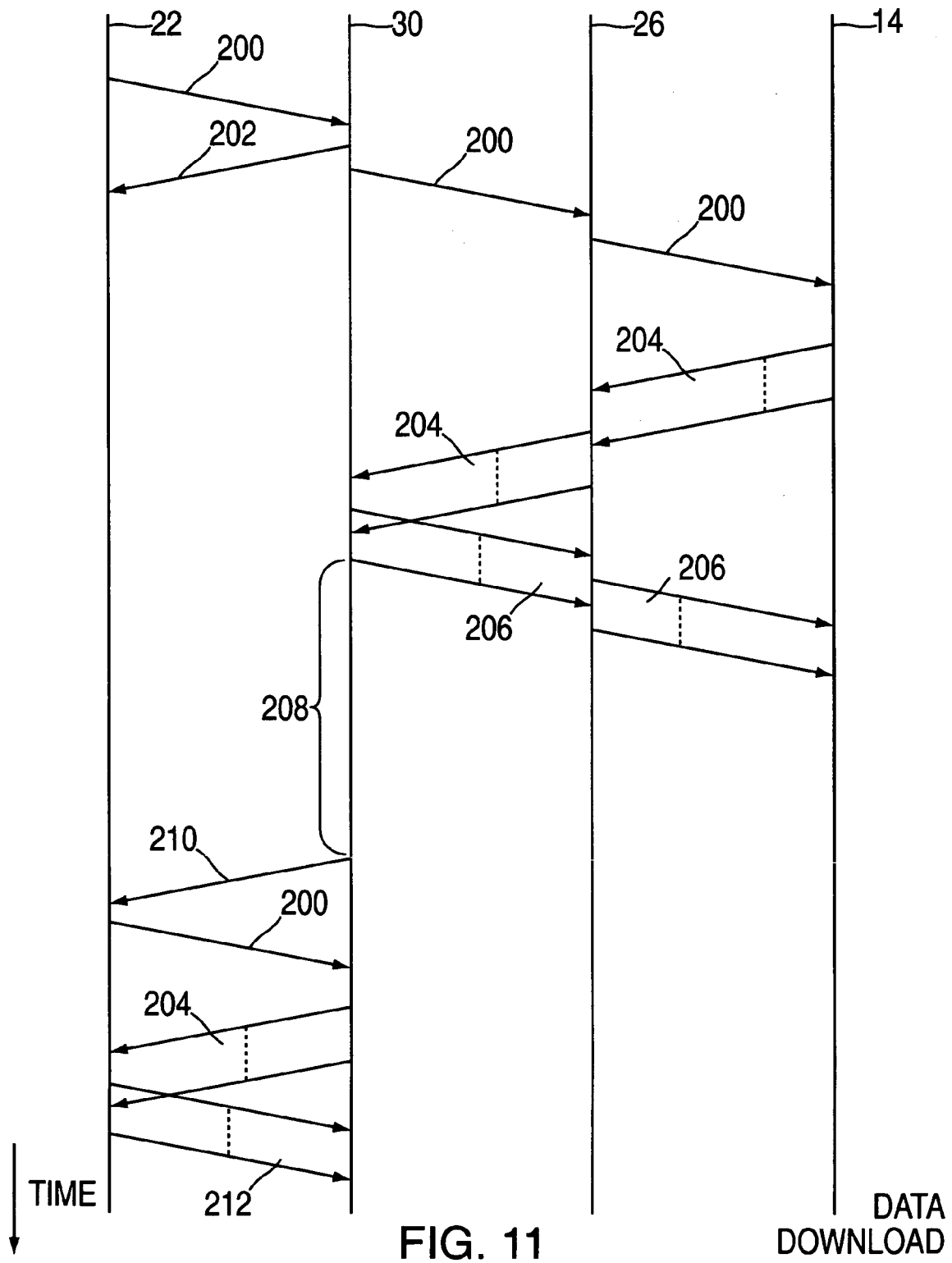
FIG. 11 depicts event ting for a communication session including the download of data.

FIG. 11 depicts event timing for a communication session including the download of data to workstation computer 22 from workstation 14. After the IP connection client 76 in workstation computer 22 and IP connection server 182 in transmission device 30 complete registration process 300, one or more packets 200 containing the download request information (upload request packet 200) are sent from workstation computer 22 to packet transmission device 30. The first download request packet 200 includes an indication from the IP connection client 76 that the IP connection client 76 will permit the data download request to be delayed by the IP connection server 182 if necessary to alleviate network traffic conditions or to meet other user or enterprise policies. Upon receiving the download request packet 200, the IP connection server 182 in packet transmission device 30 provides an acknowledgement packet 202 to workstation 22. Packet transmission device 30 then provides request packet 200 to workstation 14 via packet transmission device 26. Workstation 14 processes request packet 200 and, in response, provides a plurality of data packets 204 containing the data requested by packet 200 to packet transmission device 26. Packet transmission device 26 relays data packets 204 to packet transmission device 30, and IP connection server 182 in packet transmission device 30 provides acknowledgment packets 206 to workstation 14 via packet transmission device 26 in response. IP connection server 182 then determines, based on network traffic considerations and on parameters in the user policy table 152 and enterprise policy table 188, whether to perform the download to workstation 22 at that time or to delay the upload until later. If the download is to be delayed, as shown at 208, IP connection server 182 stores the data packets 206 in file storage 158 of packet transmission device 30. After the delay period 208 has ended, IP connection server 182 initiates the transmission of a notification packet 210 from packet transmission device 30 to workstation 22. The notification packet 210 includes registration data for the connection between workstations 22 and 14, which was previously stored in the enterprise connection table 188 during the registration process 300. The IP connection client 76 in workstation 22 uses the registration data to identify the application 74 that made the original request. IP connection client 76 then notifies the application 74 that the requested data is ready for download. In response to this notification, application 74 initiates another request packet 200, which is received by transmission device 30. In response to receiving this additional request packet 200, transmission device 30 downloads the plurality of data packets 204 to workstation 22. Workstation 22 responds by sending acknowledgement packets 212 to packet transmission device 30. The download session is now completed.

Figure 12:
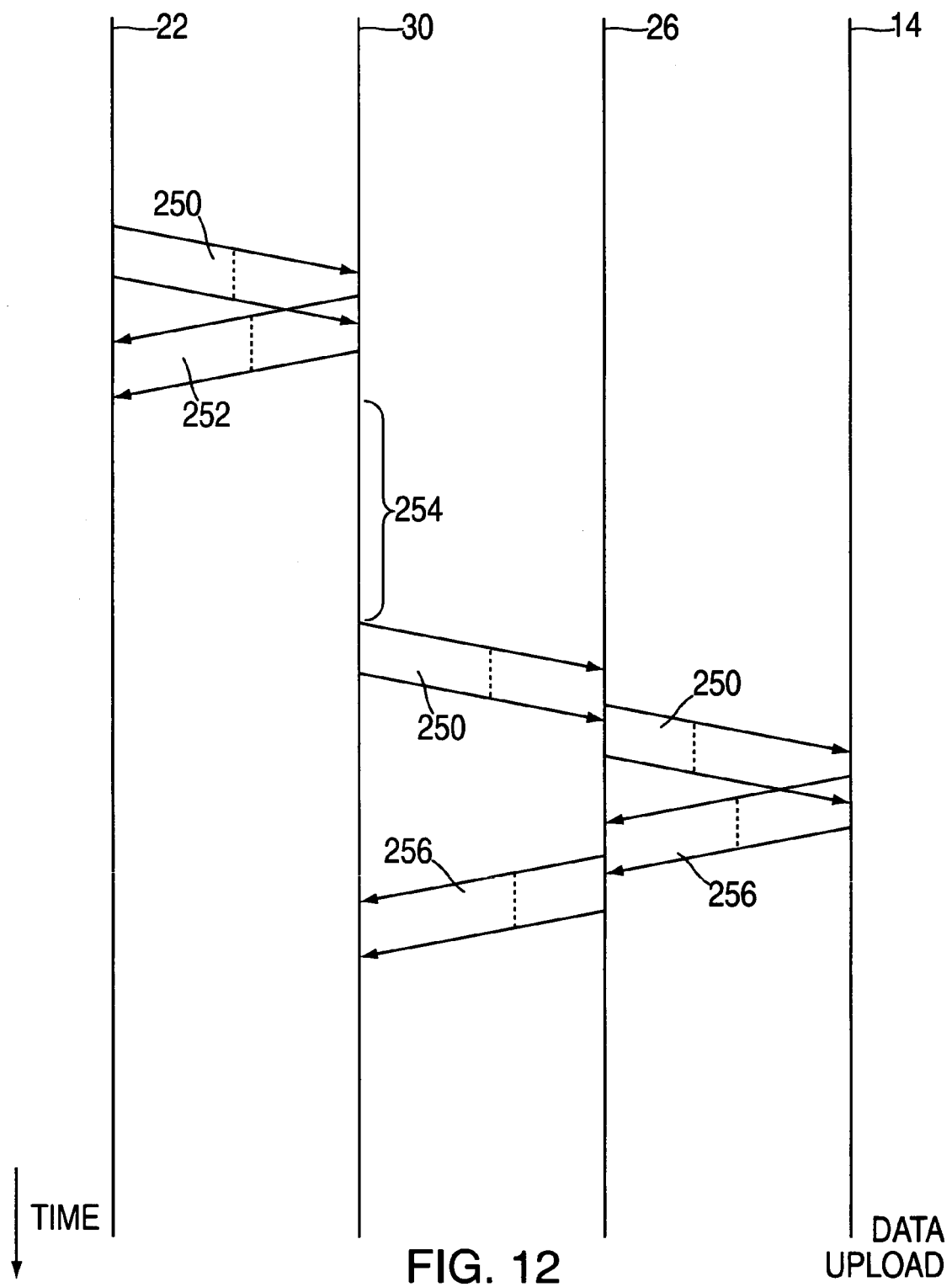
FIG. 12 depicts event timing for a communication session including the upload of data.

FIG. 12 depicts event timing for the upload of data from workstation computer 22 to workstation 14. After performing the previously-described registration process 300, workstation 22 sends one or more packets 250 containing the information to be uploaded from workstation 22 to workstation 14. The first packet 250 includes indication from the IP connection client 76 that the IP connection client 76 will permit the data upload request to be delayed by the IP connection server 182 if necessary to alleviate network traffic conditions or to meet other user or enterprise policies. The packet transmission device 30 receives each of the packets 250, and the IP connection server 182 in packet transmission device 30 provides an acknowledgement packet 252 to workstation 22 for each packet 250. IP connection server 182 then determines, based on network traffic considerations and on parameters in the user policy table 152 and enterprise policy table 186, whether to perform the upload to workstation 14 at that time or to delay the download until later. If the upload is to be delayed, as shown at 254, IP connection server 182 stores the data packets 250 in file storage 158 of packet transmission device 30. After the delay period 254 has ended, IP connection server 158 initiates the transmission of packets 250 from packet transmission device 30 to workstation 14 via packet transmission device 26. Upon receiving data packets 250, workstation 14 responds with acknowledgment packets 256, which are received by IP connection server 158 in packet transmission device 30 via packet transmission device 26. The upload session is now complete.

Figure 13:
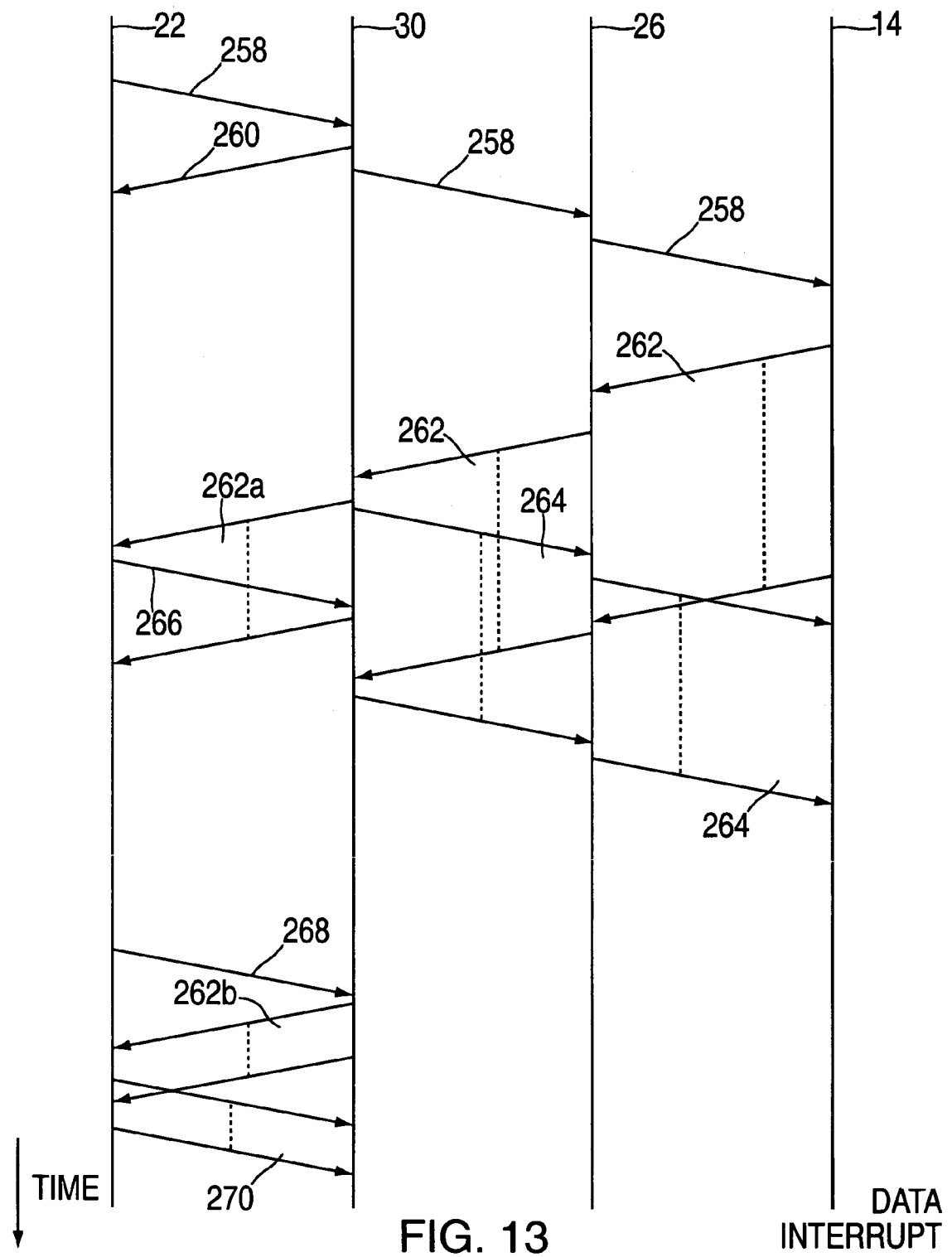
FIG. 13 depicts event timing for a communication session including an interruption of the download of data.

FIG. 13 depicts event timing for a communication session including an interruption of the download of data to workstation computer 22 from workstation 14. In FIG. 13, one or more packets 258 containing the download request information (download request packet 258) are sent from workstation computer 22 to packet transmission device 30. Upon receiving the download request packet 258, the IP connection server 182 in packet transmission device 30 provides an acknowledgement packet 260 to workstation 22. Packet transmission device 30 then provides request packet 258 to workstation 14 via packet transmission device 26. Workstation 14 processes request packet 258 and, in response, provides a plurality of data packets 262 containing the data requested by packet 258 to packet transmission device 26. Packet transmission device 26 relays data packets 262 to packet transmission device 30, and IP connection server 182 in packet transmission device 30 provides acknowledgment packets 264 to workstation 14 via packet transmission device 26 in response. IP connection server 182 then determines, based on network traffic considerations and on parameters in the user policy table 152 and enterprise policy table 186, whether to perform the upload to workstation 22 at that time or to delay the download until later. In this case, the download is not delayed, and IP connection server 182 allows the transmission of data packets 262 to workstation 14. After the first few data packets arrive at workstation 22, IP connection client 76 provides an interruption request packet 266 to workstation 30. Upon receiving the interruption request packet 266, IP connection server 182 stops the transmission of data packets 262 to workstation 22 after only a first portion of the data packets 262*a* have been received by workstation 22. When workstation 22 is ready to receive the remainder of data packets 262*a*, IP connection client provides a resume packet 268 to packet transmission device 30. Upon receiving resume packet 268, IP connection server 182 initiates the transmission of the remainder of data packets 262 (262*b*) to workstation 22. Workstation 22 responds by sending acknowledgement packets 270 to packet transmission device 30. The download session is now completed.

As shown in FIGS. 11, 12, and 13, IP connection server 182 intercepts all packets into and out of its correspondence enterprise network. Because all packets pass through IP connection server 182, it can employ IP-level security mechanisms such as packet-filtering. In packet-filtering, tables stored in file storage 158 are used to indicate what communications are allowed into and out of a particular network. An IP connection server 182 employing packet filtering would drop, reject, or permit packets based on local IP address, local port number, remote IP address, and remote port number. In another example of an IP-level security mechanism, the IP connection server 182 will strip the IP headers from the original IP datagrams, and attach new IP headers to the remaining TCP segments. The new IP headers would include the IP address of the packet transmission device in which the IP connection server 182 resides. This embodiment would, in effect, hide the IP address of the local workstation.

After an upload or download session is completed, some cleanup of the local and enterprise registration tables 150 and 188 maybe necessary. Accordingly, when a IP connection client 76 establishes a connection with an IP connection server 182, it becomes the IP connection client's responsibility to request all data streams from servers other than the one it has established a session with, as described in block 336 of process 300. After the session is completed, the IP connection client 76 will then to remove that server's name/identity from the server IP address field of the local registration table 150. The IP connection client 76 will also send a request to the primary packet transmission device for each session asking that the session data be deleted or updated to reflect the completion of the session. Each IP connection server 182 will then acknowledge this request to the IP connection client 76.

If an IP connection server 182 deletes a communications session before its completion due to enterprise policy, then that IP connection server 182 will update the enterprise registration table 188 to indicate that the session was discarded due to policy. When the IP connection client 76 re-establishes a connection (e.g., when it notifies the IP connection server 182 that it is back on line, as shown at block 336 of process 300, the IP connection server 182 will notify the IP connection client 76 of these deleted sessions and request the removal of that session from the IP connection client's local registration table 150.

If a packet transmission device is shut down, the IP connection server 182 running in that packet transmission device perform is a server shutdown procedure. First, the IP connection server 182 attempts to complete any uploads or downloads that are near completion. Second, the original IP connection server 182 provides one or more packets requesting a transfer of all active sessions (i.e., all sessions listed in the enterprise registration table 188) to an alternate packet transmission device. If the active sessions cannot be transferred, the session data and all packets related to that session are stored in file storage 158. If the active session can be transferred to an alternate packet transmission device, then the original IP connection server 182 will provide the alternate IP connection server 182 with packets including the session data and all packets related to that session. After completing the transfer to the alternate IP connection server 182, the original IP connection server 182 will notify the IP connection clients 76, and the IP connection clients 76 will update the Server IP Address field in local registration table 150.

The IP connection server 182 supports a polling mechanism where the IP connection client 76 is able to request the status of a session. Upon receiving the request, the IP connection server 182 will provide appropriate information to the IP connection client 76 such as queuing priority, % complete, and time remaining. If the IP connection server 182 has transferred this request to another IP connection server 182, then the IP connection client 76 will be notified if this redirection, and update the Server IP Address field in the local registration table 150 to indicate the new primary packet transmission device. If an IP connection client 76 sends a query to the primary packet transmission device, and the IP connection server 182 in the primary packet transmission device is unaware of this session, then the session may have been lost due to a failure in the system. The IP connection client 76 will then notify the application 74 that generated the session that the data has been lost. The application 74 will then notify the user, and request an appropriate action. Application can restart the lost session using the data in the local registration table 150.

Another important IP connection management tasks performed by the IP connection server 182 preventing the denial of service caused by a general flooding of a network in front of the packet transmission device 186. One of the easiest attacks against a network of the prior art is the denial of service. This is caused by a general flooding of a network in front of a packet transmission device to prevent the packet transmission device from receiving requests or returning data. This also happens to be one of the most difficult to prevent, because it primarily occurs on a network that is outside the control of the packet transmission device. However, if an IP connection server 182 notices that the inbound connection requests are over an enterprise defined threshold, as indicated in the enterprise policy table 186, and are causing a potential denial of service situation (possibly detected by the number of packets, frequency of connection requests from a single remote host, or bandwidth utilization) then the 1P connection server 186 notifies the destination computer(e.g., web server 24 of FIG. 1) of a potential denial of service attack. This message is primarily informational, as the destination computer can have no influence over packets destined for itself. The IP connection server 186 will then also send this denial of service information packet back along the path of the previous packet all the way back to the originating workstation, but not to the originating workstation. Along the way, any IP connection servers 186 that receive this informational message will prevent propagation of packets from the originating workstation to the destination workstation on all ports (or as customized by enterprise policy) in an attempt to prevent the denial of service attack as close to the originating workstation as possible. Each IP connection server 186 that receives the informational message will prevent the originating workstation from communicating to the remote host that it was attempting to flood for an amount of time specified by enterprise policy. Each IP connection server 186 may decide (again, based on policy) to allow the communication to proceed, but to throttle the packet transmission rate to a given level to ensure that the denial of service does not continue.

The IP connection client 76 and IP connection server 182 of the present invention allow for management of communications at the IP level. Using the registration process 300, each IP connection client 76 and IP connection server 182 is aware of the source address, destination address, and connection protocol of all network traffic that is to pass through. Using this registration data, the IP connection server 182 and IP connection client 76 can manage network traffic. These IP connection management tasks include: interrupting large download and upload requests in response to local and enterprise policies; passing download and upload tasks to other packet transmission devices; and preventing the denial of service caused by a general flooding of a network in front of the packet transmission device. In addition, the registration data can be passed between the IP connection servers 182 in different packet transmission devices, allowing the IP connection servers 182 to share management responsibilities.

The present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It will be understood that a person skilled in the art may make modifications to the preferred embodiment shown herein within the scope and intent of the claims. While the present invention has been described as carried out in a specific embodiment thereof, it is not intended to be limited thereby but is intended to cover the invention broadly within the scope and spirit of the claims

The invention claimed is:

1. A method of managing communications in a packet switching network, the method including:
 determining an inclusion of registration code in communication session data;
 in response to a determination that there is registration code in the communication session data, associating a connection protocol and an application name with connection information from an IP datagram, said connection information including an IP address of a computer originating said IP datagram, a port number in said computer originating said IP datagram, an IP address of a remote computer, and a port number in said remote computer;
 in response to the determination that the application name and the connection protocol are registered discarding the registration code in the communications session data;
 storing the communication session data in a file storage of said computer originating said IP datagram, said communication session data indicating said connection protocol, said application name, and said connection information;
 storing said communication session data in a file storage of a packet transmission device of a plurality of packet transmission devices, said packet transmission device having been determined to handle the communication session;
 updating a local registration table with an IP address for each of said plurality if packet transmission devices;
 storing a policy statement in said file storage of said packet transmission device, said policy statement including a user-selected classification of a transmission traffic-type;
 applying said policy statement to a plurality of TCP/IP packets for communication management of said plurality of TCP/IP packets;
 wherein said communication management includes a connection client of said computer originating said IP datagram that indicates a permissible delay to a connection server of said packet transmission device, said connection server determining whether one or more transmission delays are necessary in response to perform at least one of alleviating traffic on said packet switching network, meeting user policies, and meeting enterprise policies, wherein said connection client initiates a packet to said packet transmission device to notify said connection server that said packet transmission device can connect to said connection server, said connection server providing an acknowledgement and routing information to said connection client, and
 wherein said connection server reads said communication session data to compare said policy statement to said enterprise policies; and
 propagating said communication session data on said packet switching network to identify network traffic related to said communication session,
 wherein said connection client initiates said plurality of TCP/IP packets to said plurality of packet transmission devices stored in said local registration table to notify said connection server associated with said plurality of packet transmission devices that the remote computer can receive said communication data.

2. The method of claim 1, further including:
 storing at least a portion of said plurality of TCP/IP packets in said file storage of said packet transmission device.

3. The method of claim 1, wherein said policy statement indicates a priority for said application name, and said applying said policy includes:
 prioritizing said plurality of TCP/IP packets relative to other TCP/IP packets based on said application name.

4. The method of claim 1, wherein said policy statement indicates a maximum size, and said applying said policy includes:
 storing said plurality of TCP/IP packets in said file storage of said packet transmission device if said plurality of TCP/IP packets includes a number of bits exceeding said maximum size.

5. The method of claim 1, wherein said policy statement indicates a priority for said connection protocol, and said applying said policy includes:
 prioritizing said plurality of TCP/IP packets relative to other TCP/IP packets based on said connection protocol.

6. The method of claim 1, wherein said associating a connection protocol and an application name includes:
 receiving indication of said connection protocol and said application name from an application initiating said IP datagram.

7. The method of claim 1, wherein said associating a connection protocol and an application name includes:
 determining said connection protocol and said application name from said port number in said remote computer.

8. The method of claim 1, wherein said associating a connection protocol and an application name includes:
 selecting a default connection protocol and a default application name.

9. The method of claim 1, further including:
 storing said communication session data in a file storage in each of a plurality of packet transmission devices; and
 storing a policy statement in said file storage of each of said plurality of packet transmission devices.

10. The method of claim 1, wherein said policy statement is a user policy statement and said method further includes:
 storing an enterprise policy statement in said file storage of said packet transmission device; and
 applying said enterprise policy statement to said plurality of TCP/IP packets.

11. The method of claim 1, further including:
 polling said packet transmission device to determine the status of said TCP/IP packets.

12. The method of claim 1, wherein said policy statement indicates a maximum size, and said applying said policy includes:
 deleting said plurality of TCP/IP packets if said plurality of TCP/IP packets includes a number of bits exceeding said maximum size; and
 directing another packet transmission device to prevent propagation of more TCP/IP packets including said connection information.

13. A system for managing communications in a packet switching network, the system comprising:
 a workstation computer including:
  a processor configured to associate a connection protocol and an application name with connection information from an IP datagram, said connection information including an IP address of said workstation computer, a port number in said workstation computer, an IP address of a remote computer, and a port number in said remote computer, and a file storage configured to store communication session data, said communication session data indicating said connection protocol, said application name, and said connection information; and a first packet transmission device of a plurality of packet transmission devices, said packet transmission device having been determined to handle the communication session and configured to receive said communication session data from said workstation computer, wherein a local registration table is updated with an IP address for each of said plurality if packet transmission devices said first packet transmission device including:

a file storage configured to store said communication session data and a policy statement, said policy statement including a user-selected classification of a transmission traffic-type, a processor configured to identify a plurality of TCP/IP packets and apply said policy statement to said plurality of TCP/IP packets for communication management of said plurality of TCP/IP packets;

wherein said communication management includes determining an inclusion of registration code in communication session data, in response to a determination that there is registration code in the communication session data, associating a connection protocol and an application name with connection information from an IP datagram, said connection information including an IP address of a computer originating said IP datagram, a port number in said computer originating said IP datagram, an IP address of a remote computer, and a port number in said remote computer, and in response to the determination that the application name and the connection protocol are registered, discarding the registration code in the communications session data;

wherein said communication management includes a connection client of said workstation computer that indicates a permissible delay to a connection server of said first packet transmission device, said connection server determining whether one or more transmission delays are necessary in response to perform at least one of alleviating traffic on said packet switching network, meeting user policies, and meeting enterprise policies, wherein said connection client initiates a packet to said packet transmission device to notify said connection server that said packet transmission device can connect to said connection server, said connection server providing an acknowledgement and routing information to said connection client, and wherein said connection server reads said communication session data to compare said policy statement to said enterprise policies; and propagating said communication session data on said packet switching network to identify network traffic related to said communication session:

wherein said connection client initiates said plurality of TCP/IP packets to said plurality of packet transmission devices stored in said local registration table to notify said connection server associated with said plurality of packet transmission devices that the remote computer can receive said communication data.

14. The system of claim 13, wherein said file storage in said first packet transmission device is further configured to store at least a portion of said plurality of TCP/IP packets.

15. The system of claim 13, wherein said policy statement indicates a priority for said application name, and said processor in said first packet transmission device is configured to prioritize said plurality of TCP/IP packets relative to other TCP/IP packets based on said application name.

16. The system of claim 13, wherein said policy statement indicates a maximum size, and said processor in said first packet transmission device is configured to store said plurality of TCP/IP packets in said file storage of said packet transmission device if said plurality of TCP/IP packets includes a number of bits exceeding said maximum size.

17. The system of claim 13, wherein said policy statement indicates a priority for said connection protocol, and said processor in said first packet transmission device is configured to prioritize said plurality of TCP/IP packets relative to other TCP/IP packets based on said connection protocol.

18. The system of claim 13, wherein said processor in said workstation computer receives said connection protocol and said application name from an application running on said processor in said workstation.

19. The system of claim 13, wherein said processor in said workstation determines said connection protocol and said application name from said port number in said remote computer.

20. The system of claim 13, wherein said processor in said workstation selects a default connection protocol and a default application name.

21. The system of claim 13, further including:

a second packet transmission device configured to receive said communication session data from said first packet transmission device, said second packet transmission device including:

a file storage configured to store said communication session data and said policy statement, and a processor configured to identify said plurality of TCP/IP packets including said connection information and apply said policy statement to said plurality of TCP/IP packets.

22. The system of claim 13, wherein said file storage in said workstation computer is configured to store a user policy statement and said processor in said workstation computer is configured to apply said enterprise policy statement to said plurality of TCP/IP packets.

23. The system of claim 13, wherein said workstation computer polls said first packet transmission device to determine the status of said TCP/IP packets.

24. The system of claim 13, wherein said policy statement indicates a maximum size, and said processor in said first packet transmission device deletes said plurality of TCP/IP packets if said plurality of TCP/IP packets includes a number of bits exceeding said maximum size.

25. A storage medium encoded with machine-readable program instructions for managing communications in a packet switching network, the storage medium including instructions for causing a machine to implement a method comprising:

determining an inclusion of registration code in communication session data;

in response to a determination that there is registration code in the communication session data, associating a connection protocol and an application name with connection information from an IP datagram, said connection information including an IP address of a computer originating said IP datagram, a port number in said computer originating said IP datagram, an IP address of a remote computer, and a port number in said remote computer;

in response to the determination that the application name and the connection protocol are registered, discarding the registration code in the communications session data;

storing the communication session data in a file storage of said computer originating said IP datagram, said communication session data indicating said connection protocol, said application name, and said connection information;

storing said communication session data in a file storage of a packet transmission device of a plurality of packet transmission devices, said packet transmission device having been determined to handle the communication session;

updating a local registration table with an IP address for each of said plurality if packet transmission devices;

storing a policy statement in said file storage of said packet transmission device, said policy statement including a user-selected classification of a transmission traffic-type;

applying said policy statement to a plurality of TCP/IP packets for communication management of said plurality of TCP/IP packets;

wherein said communication management includes a connection client of said computer originating said IP datagram that indicates a permissible delay to a connection server of said packet transmission device, said connection server determining whether one or more transmission delays are necessary in response to perform at least one of alleviating traffic on said packet switching network, meeting user policies, and meeting enterprise policies, wherein said connection client initiates a packet to said packet transmission device to notify said connection server that said packet transmission device can connect to said connection server, said connection server providing an acknowledgement and routing information to said connection client, and wherein said connection server reads said communication session data to compare said policy statement to said enterprise policies; and propagating said communication session data on said packet switching network to identify network traffic related to said communication sessions wherein said connection client initiates said plurality of TCP/IP packets to said plurality of packet transmission devices stored in said local registration table to notify said connection server associated with said plurality of packet transmission devices that the remote computer can receive said communication data.

26. The storage medium of claim 25 further comprising instructions for causing a computer to implement:

storing at least a portion of said plurality of TCP/IP packets in said file storage of said packet transmission device.

27. The storage medium of claim 25, wherein said policy statement indicates a priority for said application name, and said storage medium further comprises instructions for causing a computer to implement:

prioritizing said plurality of TCP/IP packets relative to other TCP/IP packets based on said application name.

28. The storage medium of claim 25, wherein said policy statement indicates a maximum size, and said storage medium further comprises instructions for causing a computer to implement:

storing said plurality of TCP/IP packets in said file storage of said packet transmission device if said plurality of TCP/IP packets includes a number of bits exceeding said maximum size.

29. The storage medium of claim 25, wherein said policy statement indicates a priority for said connection protocol, and said storage medium further comprises instructions for causing a computer to implement:

prioritizing said plurality of TCP/IP packets relative to other TCP/IP packets based on said connection protocol.

30. The storage medium of claim 25, wherein said associating a connection protocol and an application name includes:

receiving indication of said connection protocol and said application name from an application initiating said IP datagram.

31. The storage medium of claim 25, wherein said associating a connection protocol and an application name includes:

determining said connection protocol and said application name from said port number in said remote computer.

32. The storage medium of claim 25, wherein said associating a connection protocol and an application name includes:

selecting a default connection protocol and a default application name.

33. The storage medium of claim 25, further comprising instructions for causing a computer to implement:

storing said communication session data in a file storage in each of a plurality of packet transmission devices; and storing a policy statement in said file storage of each of said plurality of packet transmission devices.

34. The storage medium of claim 25, wherein said policy statement is a user policy statement, and said storage medium further comprises instructions for causing a computer to implement:

storing an enterprise policy statement in said file storage of said packet transmission device; and applying said enterprise policy statement to said plurality of TCP/IP packets.

35. The storage medium of claim 25, further comprising instructions for causing a computer to implement:

polling said packet transmission device to determine the status of said TCP/IP packets.

36. The storage medium of claim 25, wherein said policy statement indicates a maximum size, and said storage medium further comprises instructions for causing a computer to implement:

deleting said plurality of TCP/IP packets if said plurality of TCP/IP packets includes a number of bits exceeding said maximum size; and directing another packet transmission device to prevent propagation of more TCP/IP packets including said connection information.

* * * * *